No. 615,780. Patented Dec. 13, 1898.
C. T. AUSTEN.
BICYCLE WHEEL ASSEMBLING MACHINE.
(Application filed Sept. 23, 1897.)
(No Model.) 7 Sheets—Sheet 1.

No. 615,780. Patented Dec. 13, 1898.
C. T. AUSTEN.
BICYCLE WHEEL ASSEMBLING MACHINE.
(Application filed Sept. 23, 1897.)

(No Model.) 7 Sheets—Sheet 2.

No. 615,780. Patented Dec. 13, 1898.
C. T. AUSTEN.
BICYCLE WHEEL ASSEMBLING MACHINE.
(Application filed Sept. 23, 1897.)
(No Model.) 7 Sheets—Sheet 3.

No. 615,780. Patented Dec. 13, 1898.
C. T. AUSTEN.
BICYCLE WHEEL ASSEMBLING MACHINE.
(Application filed Sept. 23, 1897.)

(No Model.) 7 Sheets—Sheet 4.

No. 615,780. Patented Dec. 13, 1898.
C. T. AUSTEN.
BICYCLE WHEEL ASSEMBLING MACHINE.
(Application filed Sept. 23, 1897.)

(No Model.) 7 Sheets—Sheet 5.

Witnesses
Guy E. Davis.
M. Thomas.

Inventor
Charles T. Austen
By his Attorneys
Buedeon Davidson Wight

No. 615,780. Patented Dec. 13, 1898.
C. T. AUSTEN.
BICYCLE WHEEL ASSEMBLING MACHINE.
(Application filed Sept. 23, 1897.)
(No Model.) 7 Sheets—Sheet 6.

No. 615,780. Patented Dec. 13, 1898.
C. T. AUSTEN.
BICYCLE WHEEL ASSEMBLING MACHINE.
(Application filed Sept. 23, 1897.)
(No Model.) 7 Sheets—Sheet 7.

Fig. 12.

Witnesses
Guy E. Davis.
M. Thom's.

Inventor
Charles T. Austen
By his Attorneys
Brelson Davidson Wight

UNITED STATES PATENT OFFICE.

CHARLES THOMAS AUSTEN, OF LONDON, ENGLAND.

BICYCLE-WHEEL-ASSEMBLING MACHINE.

SPECIFICATION forming part of Letters Patent No. 615,780, dated December 13, 1898.

Application filed September 23, 1897. Serial No. 652,785. (No model.)

*To all whom it may concern:*

Be it known that I, CHARLES THOMAS AUSTEN, a subject of the Queen of Great Britain, residing at Lewisham, London, in the county of Kent, England, have invented a certain new or Improved Device or Appliance for Use in Making Up or Building Cycle-Wheels and the Like, (for which I have obtained patents in Great Britain, No. 10,572, bearing date May 28, 1895; in France, No. 265,973, bearing date April 13, 1897, and in Belgium, No. 127,572, bearing date April 13, 1897, and No. 127,670, bearing date April 17, 1897,) of which the following is a specification.

My invention relates to a new or improved device or appliance for use in making up or building cycle-wheels and the like, and refers more particularly to that class of wheel in which tangent spokes are employed, in conjunction with which nipples are also used, my improved device or appliance having for its object to more easily, effectually, and expeditiously screw up the said nipples for securing the spokes to the rim or felly of the wheel than heretofore, whereby a great saving of time is effected.

My said device or appliance may either be operated by hand or by any suitable mechanical power, and in the latter case means are provided whereby the driving mechanism will be automatically thrown out of gear at the proper time and the parts reset for the next operation.

My invention likewise comprises the various other improvements hereinafter indicated.

In the accompanying drawings, Figure 1 is a side elevation, and Fig. 2 is a plan, showing one form of my improved device arranged to be operated by hand-power. Fig. 3 is a side elevation, Fig. 4 a reverse view, and Figs. 5 and 6 are sectional views, showing a modified form thereof. Figs. 7, 8, 9, 10, $10^a$, $10^b$, $10^c$, $10^d$, and $10^e$ show one arrangement of my apparatus adapted to be operated by power, Fig. 7 being a plan, Fig. 8 a front view, Figs. 9 and 10 end views, Fig. $10^a$ a vertical section through the line $x'\,x'$ of Fig. 8 looking to the left, Fig. $10^b$ a similar section through the same line looking to the right, Fig. $10^c$ a similar section through the line $y'\,y'$ looking to the right, and Figs. $10^d$ and $10^e$ are details, Fig. $10^d$ being drawn to an enlarged scale. Fig. 12 is a plan.

Referring generally to the drawings, $a$ is a frame, and $b$ is a toothed wheel rotatably mounted in the bracket or supporting-arm $c$ thereof. The toothed wheel $b$ is provided with a radial slot $b'$, and its supporting-arm $c$ has a similar slot $c'$, so as (when the two slots coincide) to leave an opening through which the spoke and the shank or stem of the loosely-attached nipple can be passed for the purpose of bringing the nipple into the squared portion $b^*$ of the toothed wheel $b$, as hereinafter described.

$d$ is a toothed wheel mounted upon one end of a spindle and meshing with the wheel $b$.

Figures 1, 2, 6:
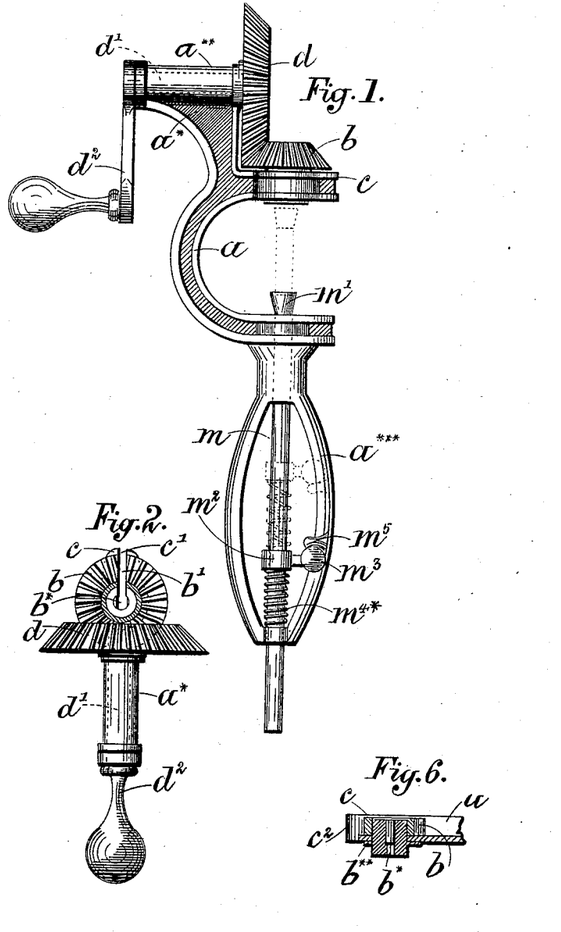
Figure 3:
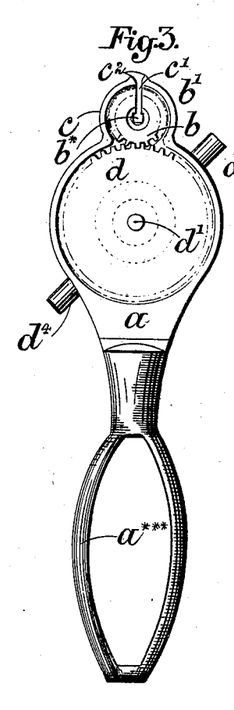
Figure 4:
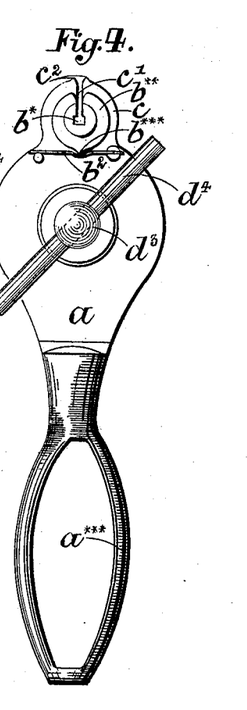
Figure 5:
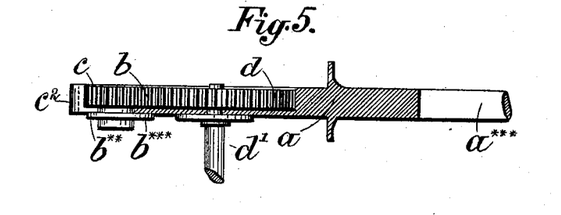

Referring now more particularly to Figs. 1 and 2, the toothed wheel $d$ is mounted upon one end of the spindle $d'$, which latter is supported, as shown at $a^{**}$, in an arm $a^*$ upon the frame $a$ and has upon its other or opposite end a crank-handle $d^2$. $a^{*}$ is a handle firmly secured to or formed on the opposite or other end of the frame $a$, so as to be coaxial with the toothed wheel $b$. $m$ is a rod or plunger passing through suitable holes in the handle $a^{*}$ and frame $a$, the axis of which rod or plunger coincides with that of the said toothed wheel $b$, and the inner or one end whereof is shaped, as shown at $m'$, and slightly recessed or hollowed out, so as to take the head of the nipple when in use, for the purpose of holding or supporting the same against the rim or felly of the wheel, the position assumed by the said rod or plunger in this latter case being that indicated by the dotted lines in Fig. 1. $m^2$ is a collar secured upon the rod or plunger $m$, which collar is provided with a set-screw $m^3$, which also serves as a handle. $m^{4*}$ is a spiral spring which bears against the said collar $m^2$ and the lower end of the handle $a^{*}$. When the rod or plunger $m$ is out of use, the handle $m^3$ engages with a stop $m^5$ upon the handle $a^{*}$, and the rod or plunger $m$ is drawn back and the spring $m^{4*}$ is under compression; but on the release of the said handle $m^3$ the said rod or plunger $m$ is forced forward or moved under the action of the spring $m^{4*}$ into the position shown by the dotted lines in Fig. 1. In some cases I attach the spring $m^{4*}$ at one end to the lower part of the handle $a^{*}$ and at the other to the collar $m^2$. When arranged in this manner, the rod $m$ is raised into the position shown in dotted lines for holding the nipple against the rim by hand and is retained in the said raised position by a stop on the handle $a^{*}$, also shown in dotted lines in Fig. 1, until the nipple has been sufficiently screwed up, when the handle $m^3$ is released from the said stop and the rod is drawn back to its lower or normal position by the said spring $m^{4*}$. The spoke having been passed through the hole in the rim or felly of the wheel and provided with a nipple, which is screwed on by hand in the ordinary way sufficiently to retain it in position, is passed through the said slots $b'$ $c'$ until it reaches the squared portion $b^*$ of the toothed wheel $b$. The apparatus is then moved along the spoke until the squared shank or stem of the nipple engages well within the said square hole $b^*$. Upon revolving the toothed wheel $d$, by means of the handle $d^2$, the toothed wheel $b$ is caused also to revolve, carrying with it the nipple, and thereby screwing up the spoke in a few turns or revolutions of the actuating-wheel, the said nipple being meanwhile held in position against the rim or felly of the wheel by the enlarged end $m'$ of the rod or plunger $m$ and the said rod or plunger upon the handle $m^3$ being released from the stop $m^5$, which is effected by partly revolving the rod, assuming the position shown in dotted lines under the action of the spring $m^{4*}$, as has been already mentioned, or being moved into the said dotted position by hand and retained therein by the stop shown in dotted lines and is returned to its normal or original position by the spring $m^{4*}$ upon being released by hand when the spoke is screwed up.

In the modification illustrated in Figs. 3, 4, 5, and 6 the frame $a$ is formed flat and is provided with circular recesses, wherein are located the radially-slotted toothed wheel or pinion $b$ and the larger or driving toothed wheel $d$. In order that the radial slot formed in the wheel $b$ may be readily brought to coincide with the radial slot or opening formed in the part or extension $c$ of the frame $a$, supporting it, a washer, collar, or flange $b^{}$ is provided upon the boss of the said toothed wheel or pinion $b$, which washer is formed with a point or projection $b^{*}$, Fig. 4, which, when the said wheel is in the required position, engages with a nick or recess formed in a spring $b^2$, the tension of the latter being sufficient to hold the wheel steady while the spoke and nipple are placed in position, but allowing the aforesaid wheel to be revolved when pressure is applied to the handle. The spindle $d'$ of the larger or driving toothed wheel $d$ is in this case provided with a knob or boss $d^3$, having a cross-bar $d^4$ instead of the crank-handle $d^2$, before mentioned with regard to Figs. 1 and 2.

The operation of the hand-power device, as shown in Figs. 3 to 6, is essentially the same as that shown in Figs. 1 and 2—viz., the spoke being first passed through the slots $b'$ $c'$ (which are brought to coincide) until the squared stem or shank of the nipple is contained within the squared hole or recess $b^*$ of the toothed wheel or pinion $b$ when, upon turning the larger or driving toothed wheel $d$ by means of the handle, cross-bar, or key $d^4$, the smaller toothed wheel or pinion $b$ will be revolved, and will carry with it the nipple, so as to screw up the spoke, as hereinbefore described.

In Figs. 7 to 13 I have shown two forms or modifications of my tool or apparatus wherein provision is made for enabling the same to be operated by power. In this case I provide, moreover, means whereby the driving mechanism will be automatically thrown out of gear at the proper time.

Figure 7:
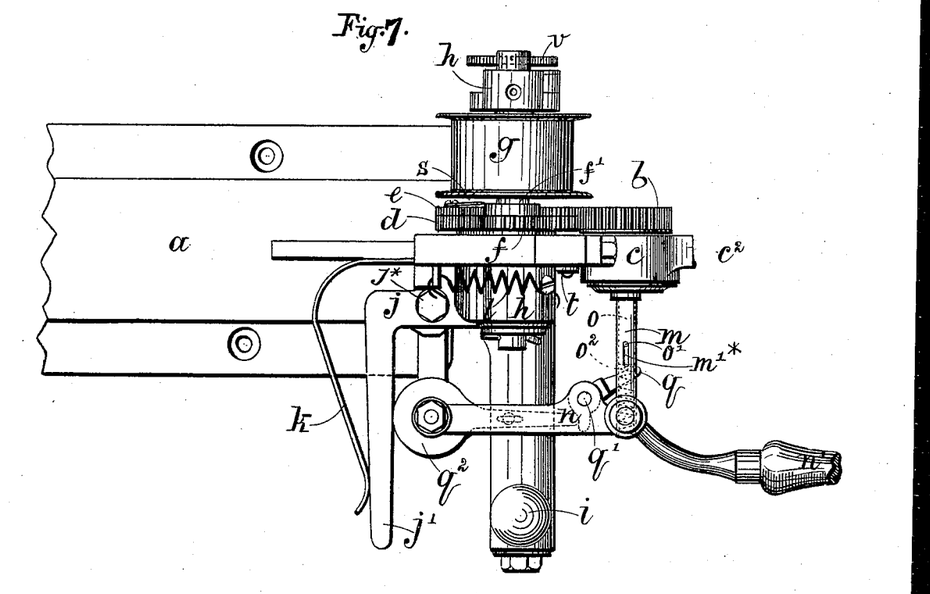
Figure 8:
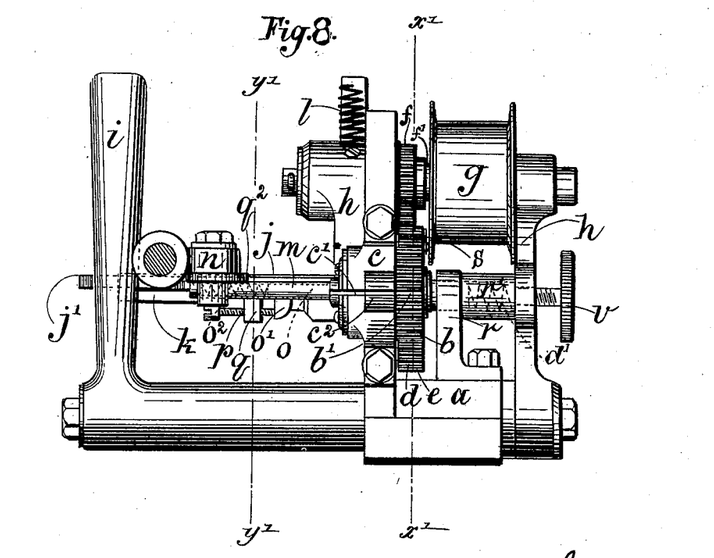
Figure 9:
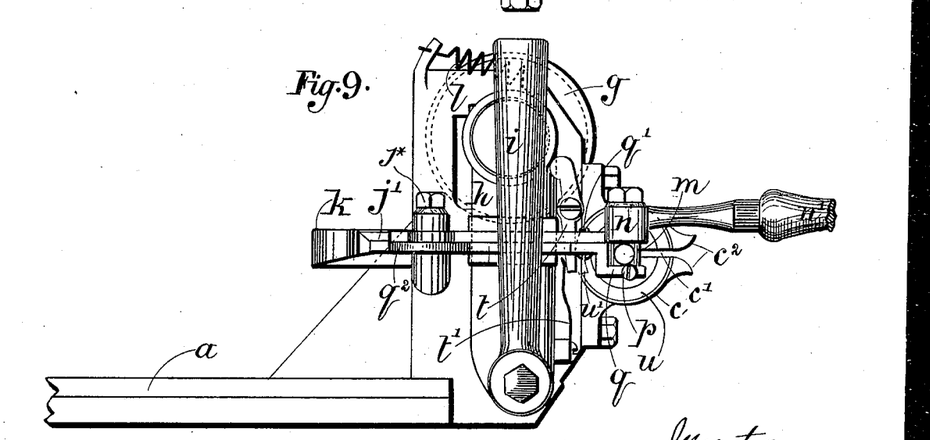
Figure 10:
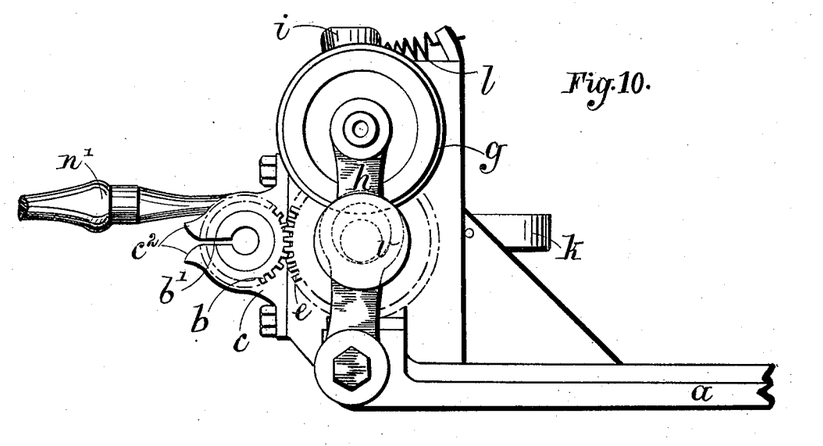
Figure 10A:
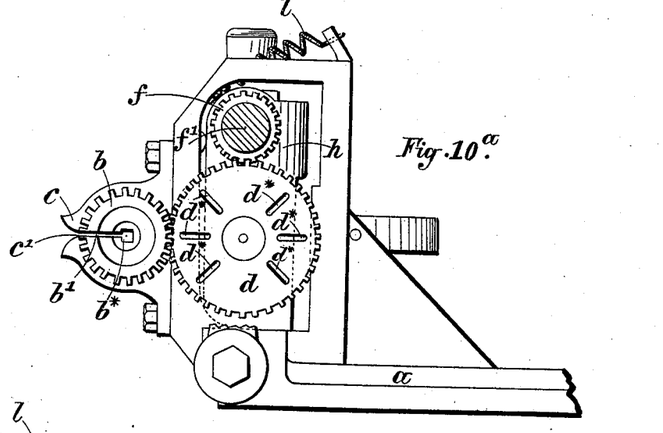
Figure 10B:
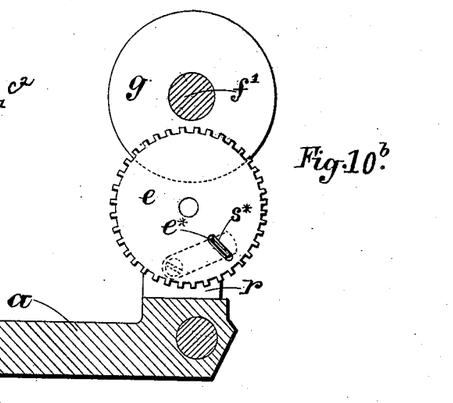
Figure 10C:
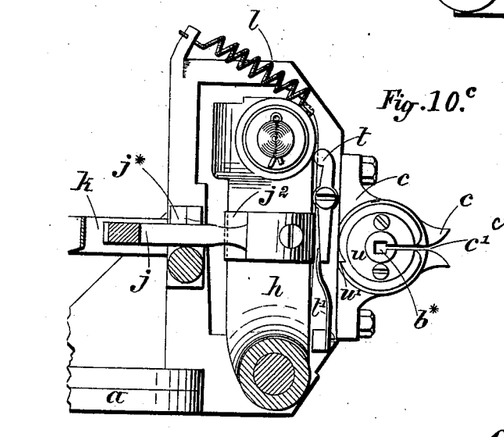
Figure 10D:
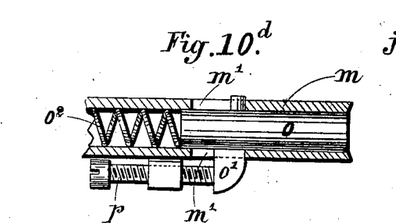
Figure 10E:
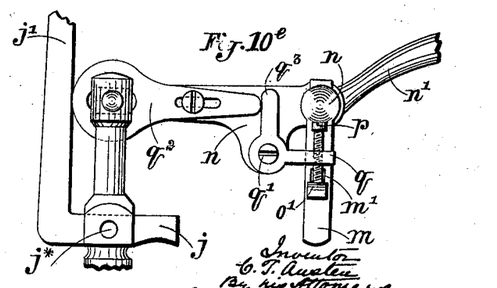

Referring, first, to Figs. 7 to $10^e$, the radially grooved or slotted pinion $b$ is rotatably mounted in the arm or bracket $c$ upon the frame $a$, which bracket is likewise provided with a radial groove, slot, or way $c'$ for the purpose of admitting the spoke and nipple-stem about to be operated on, substantially the same in principle as those already described with reference to the hand-power appliance, the frame $a$ being adapted in this instance to be bolted or secured to a table, bench, or other support. $d$ is the toothed driving-wheel on one spindle, and $e$ is a second driving or actuating toothed wheel mounted upon another spindle, but coaxially with the toothed wheel $d$, both of which are arranged to gear or mesh with the pinion $b$. The toothed wheel $e$ is constantly in gear with the pinion $b$; but the toothed wheel $d$ is so mounted as to be normally free of such pinion but in frictional contact with $e$, as hereinafter described. $f$ is a third toothed wheel meshing with the wheel $d$. $f'$ is the spindle upon which the wheel $f$ is formed or mounted, and upon a reduced extension of this same spindle is keyed or otherwise secured a flanged wheel or pulley $g$, adapted to receive rotary motion through a driving-band from any available source of power. The dimensions of the said toothed wheels $f$, $d$, $e$, and $b$ and of the pulley $g$ are such as to insure the desired speed of $b$. The wheels $d$ and $f$ and the pulley $g$ are mounted on a swinging arm or block $h$, which can be oscillated by means of a crank-handle $i$. The said arm or block is normally held in its backward position by a spring $l$, so that the wheels $d$ and $b$ are out of gear. The movement of the crank-handle $i$ operates to throw the wheels $d$ and $b$ into gear, as shown in the drawings, and a catch $j$, pivoted on a suitable part of the framework, as at $j^\times$, and actuated by a spring $k$, engages with a step $j^2$ on the arm or block $h$ and retains the said wheels $d$ and $b$ in gear. The toothed wheel $e$ is mounted on a bracket $r$ and is kept in frictional contact with the wheel $d$ by means of a spiral spring, as shown in dotted lines in Fig. 8, located in a projection $r'$ of the bracket $r$, the friction being adjustable through the milled headed screw $v$. It is necessary that there be sufficient friction between the faces of these wheels $d$ and $e$. Their frictional contact may be augmented, if necessary, by a clutching or catching device. This may consist of a spring-catch $s$, mounted upon the toothed wheel $e$ and having a projection $s^\times$, adapted to pass through a slot $e^\times$ therein and engage in one or other of a series of suitable radial slots, recesses, or the like $d^\times$, formed in the face of the toothed wheel $d$. $m$ is a tubular push-piece (shown in detail and on an enlarged scale in Fig. $10^d$) mounted upon the free end of an arm $n$, pivoted to part of the framework, so that it can be moved to or away from the bracket $c$ through a suitable handle $n'$. Within the said push-piece $m$ is a rod or plunger $o$. A projection $o'$ is fixed to the plunger $o$ and projects through a slot $m'$ in such push-piece $m$. The said projection $o'$ is adjustably connected through an adjustment-screw $p$ or the like with one arm $q$ of a bent lever pivoted at $q'$ to the lever $n$ and the other arm $q^3$ of the lever $q$ engages with a tail or projection $q^2$, slidably mounted beneath the arm $n$, as clearly seen in Fig. $10^e$, and which tail or projection $q^2$ is designed to come into contact with the tail $j'$ of the hereinbefore-mentioned catch $j$. $o^2$ is a spring which keeps the plunger $o$ in its forward position. $t$ is a catch pivotally mounted on the framework, as shown, and under the influence of a spring $t'$. One of its ends is designed to be in contact with the swinging arm $h$ and the other end, as hereinafter explained, to engage with a notch $u'$ in a disk or extension $u$, formed on or attached to the pinion $b$. Premising the slot $b'$ in the pinion $b$ and the slot $c'$ in the bracket $c$ to be in alinement and the swinging arm or bracket $h$ pulled in its backward position by its spring $l$, the catch $j$ will be raised from the step $j^2$, the extremity of the catch $t$ will be in engagement with the slot $u'$, and the toothed wheel $d$ will be free of the pinion $b$. Any one spoke and nipple of the loosely-put-together wheel may now be passed within the slots $b'$ $c'$ and the nipple-stem brought within the square $b^\times$ of the pinion $b$ or its attachment $u$. The wheel-rim will lie between the part $u$ of the pinion $b$ and the push-piece $m$, and the latter will then be pressed and retained firmly upon the nipple-head which lies within the channel of the rim by the operator manipulating the handle $n'$. At this moment, assuming the pulley $g$ is being driven from the power-shaft, the toothed wheel $f$ will be in motion and will be meshing with and rotating the wheel $d$, but such wheel $d$, as before explained, is clear of the pinion $b$. This latter and the toothed wheel $e$ meshing with it being locked by the catch $t$ are stationary, and consequently the frictional contact between the wheels $d$ and $e$ is overcome. Upon the operator pulling over the lever $i$ the bracket $h$ will be swung toward the pinion $b$. Thereupon the catch $t$ will be freed from the slot $u'$ and the catch $j$ will fall into the step $j^2$, as clearly shown in Fig. $10^c$, while the toothed wheel $d$ will be brought into gear with the pinion $b$. The complete train will then commence to run, the pinion $b$ screwing up the nipple until the spoke end comes into contact with the plunger $o$. Said plunger will then be forced backward, its projection $o'$ operating the lever end $q$, which in turn moves the tail $q^2$ to operate $j$, releasing it from the step $j^2$, whereupon the bracket $h$ swings back again under the influence of the spring $l$ and the toothed wheel $d$ becomes thrown out of gear from the pinion $b$. Owing, however, to the frictional contact between the wheels $d$ and $e$, the former will continue to rotate the latter, and the latter will rotate the pinion $b$ until the slots $b'$ $c'$ are again in alinement and the catch $t$ fallen into the slot $u'$. Then $b$ and $e$ again become locked, $f$ and $d$ rotating idly, the latter overcoming the frictional contact between itself and $e$. The tightened-up spoke and nipple can then be removed, another inserted, and the operation repeated.

The exact predetermined point at which the spoke end will meet and operate the plunger $o$ can be arranged to great nicety by the screw $p$ or equivalent adjustment, or alternatively the plunger might be provided with a projection to enter the nipple, so that the herein-described arrangement would be actuated before the spoke end had passed through the said nipple.

Alternatively I might provide the slotted pinion $b$ with a handle for allowing of its being brought into alinement by hand.

Instead of the nipple-supporting device being held against the rim or felly of the wheel by hand I may employ a spring, weight, or other convenient means for keeping it in position.

Figure 11:
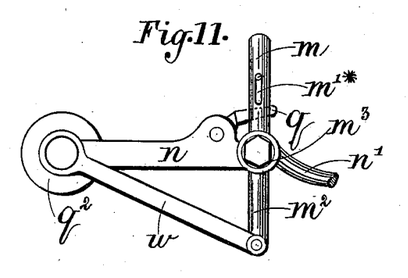
Fig. 11 is a plan showing a slight modification of part thereof.

In Fig. 11 I have shown a slight modification of the arrangement shown in Figs. 7 to $10^e$, wherein the nipple-supporting device $m$ is extended, as at $m^2$, and is connected with the pivot-point of the lever $n$ by means of a link or rod $w$. In this instance the said nipple-supporting device is so mounted at the point $m^3$ as to be free to pivot freely thereon and to move in a parallel direction, the said pivoting movements, however, being governed by the link or rod $w$. In other respects the mechanism is similar to corresponding mechanism shown in other figures of the drawings.

Figure 12:
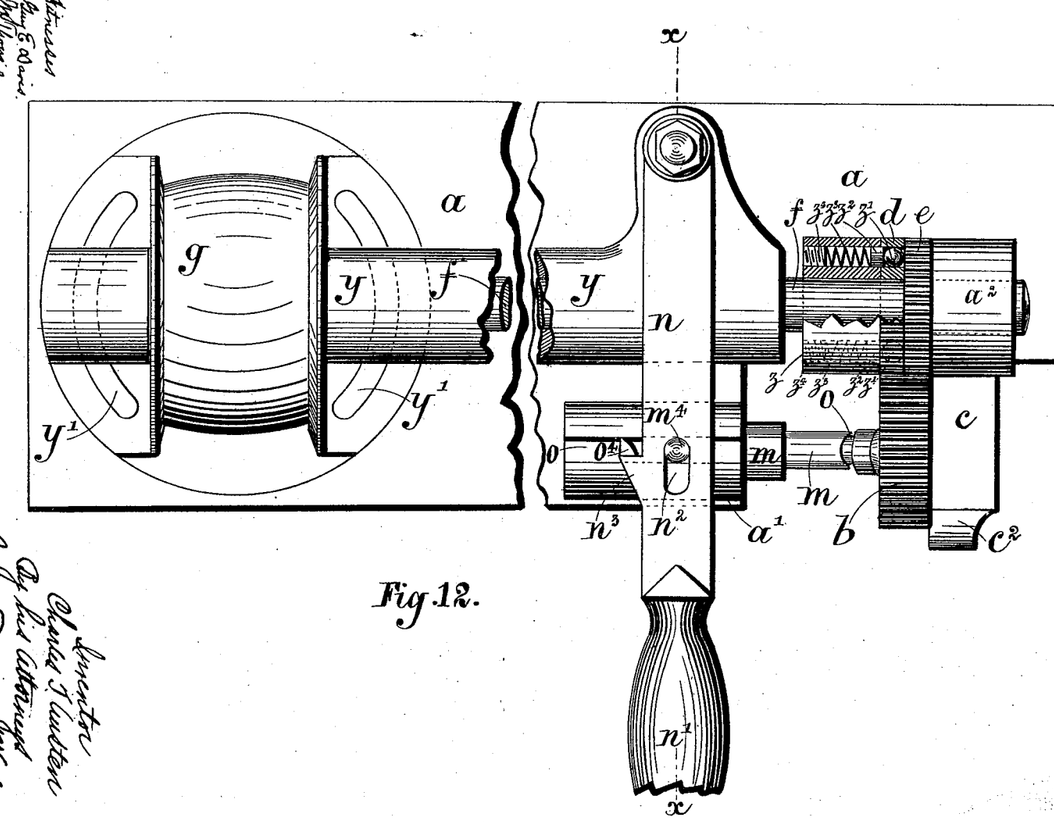
Figure 13:
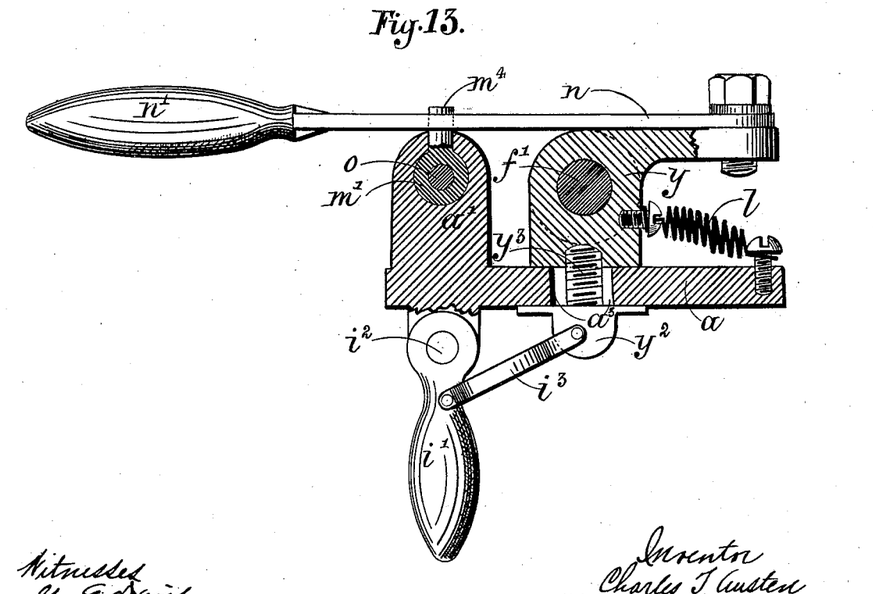
Fig. 13 is a vertical section on the line $x\,x$, showing a modified form of my apparatus also adapted to be operated by power.

In Figs. 12 and 13 a modified arrangement is shown. The spindle $f'$, which in this case, besides carrying the flanged pulley $g$, also carries a coupling-box or friction-clutch $z$ and the actuating-pinion $d$, is supported in a swinging arm or block $y$, which latter is pivotally mounted through a ball-race or otherwise to the bed $a$, as indicated at $y'$. The toothed or spur wheel $e$ is independently mounted in a fixed bracket $a^2$ and is constantly in gear with the pinion $b$. The coupling-box or friction-clutch may be fast on the spindle $f'$, or the said spindle $f'$, the box $z$, and the pinion $d$ may be formed in one piece. The box $z$ is drilled with a suitable number of holes, in each of which is inserted a ball $z'$. A plug $z^2$, behind which is a spring $z^3$, presses the ball $z'$ upon the face of the spur-wheel $e$, which has radial grooves formed thereon, with which the balls $z'$ engage. $z^4$ is an adjusting-screw for regulating the amount of friction. Thus rotary motion is imparted to the toothed or spur wheel $e$ and to the pinion $b$, the whole train being in gear during the tightening process. After the pinion $d$ has been thrown out of gear from the pinion $b$ the pinion $e$ still communicates its motion to pinion $b$, so as to bring the slot $b'$ therein in line or cause it to coincide with the slot $c'$ in its bearing $c$, a suitable spring or other catch locking it in position, as before. $i'$ is a hand-lever pivoted at $i^2$ to the bed $a$ and connected through a link or connecting-rod $i^3$ with a lug $y^2$, secured to the swinging arm or block $y$ by a screwed shank $y^3$, arranged to work or move in a slot $a^3$ in the bed $a$, and thus to admit of the said swinging arm or block $y$ being moved through the hand-lever $i'$ against the pull of the spring $l$ to bring the whole gear into train. The nipple-supporting device $m$ is so mounted in a bracket $a'$, formed on or attached to the bed $a$, as to be free to move therein in a longitudinal direction, and such movements can be imparted thereto by the operating-lever $n$, slot $n^2$, and pin $m^4$. The actuating-pinion $d$ is (in like manner to the arrangement described with reference to Figs. 7, 8, 9, and 10) kept normally out of gear by the spring $l$, Fig. 13, which is in this instance connected to the bed $a$ and the swinging arm or block $y$, as already described. To maintain the pinion $d$ in engagement with the pinion $b$, I provide upon the pivoted lever $n$ a catch $n^3$, which when the said wheels are in gear engages with a pin or projection $o^4$ upon the rod or plunger $o$. It will be seen that upon the spoke passing through the nipple it will operate the rearward movement of the rod or plunger $o$, and consequently disengage the pin or projection $o^4$ from the catch $n^3$, whereupon the swinging arm or block $y$ will be moved by the spring $l$, so as to throw the toothed wheels $d$ and $b$ out of gear. I may provide a screw or equivalent adjustment for regulating the point at which the spoke will meet and operate the rod or plunger $o$.

It will be seen that an essential feature of the invention is the provision of a wheel or disk having a slot, opening, or way leading to a squared recess or hole for the purpose of containing or holding the shank of the nipple, and, although I have described such wheel or disk as being rotated by bevel or gear wheels, it is obvious that other suitable means may be employed for revolving the same—such, for instance, as ratchet mechanism; but I preferably adopt the forms or arrangements described and shown in the accompanying drawings.

To facilitate the entrance of the spoke, the slot $c'$ in the part $c$ of the frame $a$ is preferably formed flaring or bell-mouthed, as shown at $c^2$.

What I claim, and desire to secure by Letters Patent of the United States, is—

1. The combination of a wheel provided with a squared nipple-socket and having a slot extending laterally from its center to its circumference, a bracket formed with a similar slot which registers at times with the slot in the wheel, a supporting-frame for the bracket, and means carried by the frame for actuating the wheel.

2. The combination of a wheel having a slot extending laterally from its center to its circumference, and having a nipple-socket, a bracket formed with a similar slot which registers at times with the slot in the wheel, a supporting-frame for the bracket, an actuating or driving wheel carried by the frame, and a nipple-supporting rod also carried by the frame.

3. The combination of a slotted wheel and a slotted bracket provided with a nipple-socket, means for imparting rotary motion to the wheel, and means for arresting such motion and locking the wheel when the spokes or nipples are screwed up to the desired amount.

4. The combination of a slotted wheel having a nipple-socket, a slotted bracket, means for imparting rotary motion to the wheel, means for arresting such motion and locking the wheel when the spokes or nipples are screwed up to the desired amount, and means for resetting the mechanism for the next operation.

5. The combination of a slotted wheel and bracket, provided with a nipple-socket, the wheels $d$, $e$, $f$, pulley $g$, swinging frame, nipple-support, $m$, rod or plunger, $o$, projection, $o'$, bent lever, $q$, catch, $j$, and spring, $l$, serving as means for imparting rotary motion to the slotted wheel and for arresting said motion when the nipples are screwed up the desired amount.

6. The combination of a slotted pinion, a slotted bracket, toothed wheels $d$, $e$, and means for coupling or connecting said last-mentioned wheels to bring the radial slot in the pinion opposite or in line with that of the bracket.

CHARLES THOMAS AUSTEN.

Witnesses:
A. F. SPOONER,
T. G. DAKIN.